Oct. 31, 1950  H. E. BALSIGER ET AL  2,528,295
INDICATING DEVICE
Filed April 21, 1944
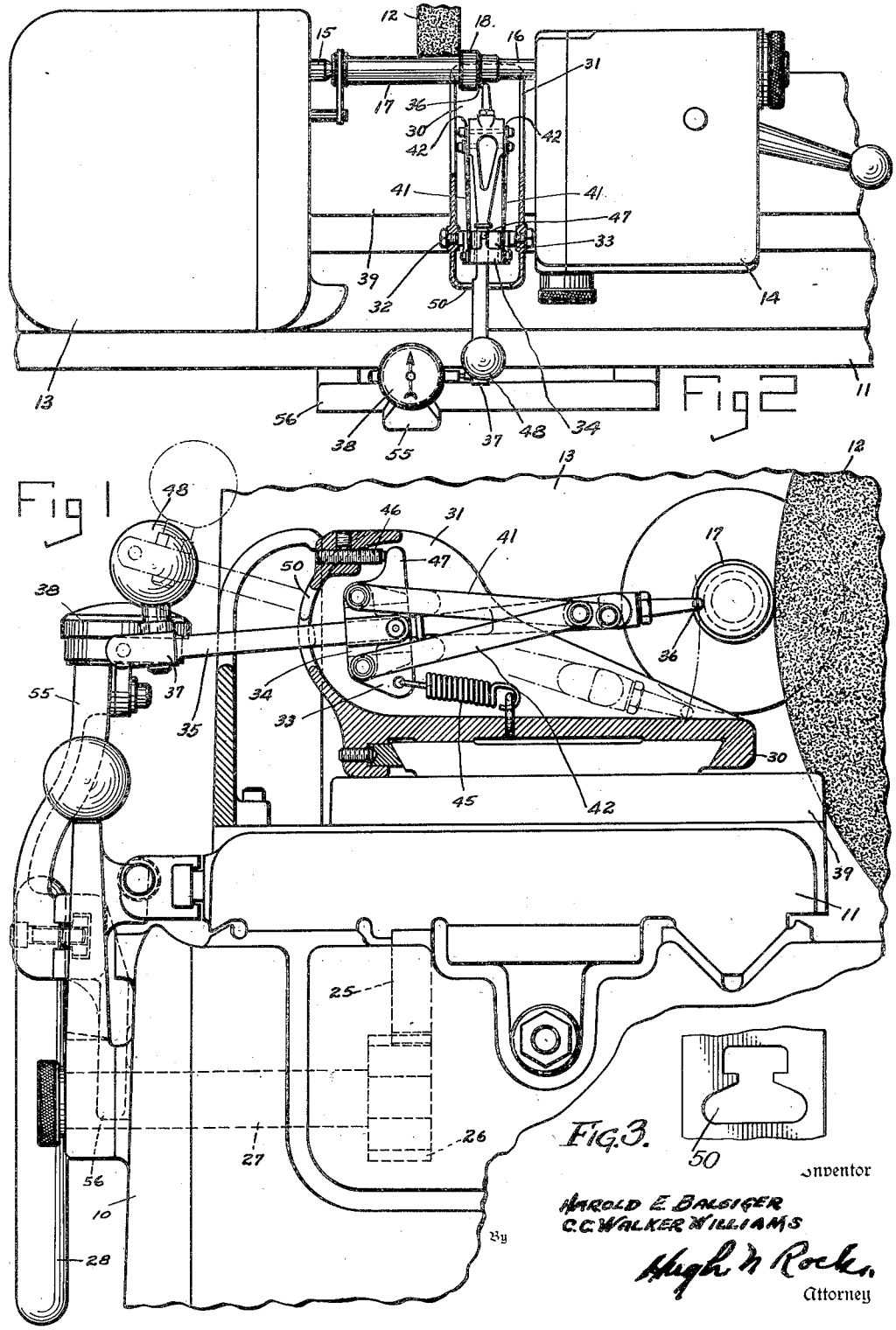
Inventor
HAROLD E. BALSIGER
C.C. WALKER WILLIAMS
By Hugh N Rock
Attorney Patented Oct. 31, 1950

2,528,295

UNITED STATES PATENT OFFICE 2,528,295

INDICATING DEVICE

Harold E. Balsiger and C. C. Walker Williams, Waynesboro, Pa., assignors to Landis Tool Company, Waynesboro, Pa.

Application April 21, 1944, Serial No. 532,174

5 Claims. (Cl. 51—165)

This invention relates to a device which may be used for laterally locating a work piece accurately relative to a cutting tool or for indicating a change in size of a work piece.

Previous devices used for this purpose usually consisted of some form of positive stop, which was moved into operative position to engage a locating surface on a work piece. This engagement was usually effected by longitudinal adjustment of the work carriage. Such devices were often inconvenient to use and were not dependable where a high degree of accuracy was desired.

They were particularly undependable because the center holes in work pieces are seldom uniform. If, for example, a center hole at the headstock end of the work piece is deeper than usual, the work piece will be positioned more to the left when placed in the machine. Under these circumstances, it is obvious that, if a shoulder is to be ground, the proper size could not be obtained by moving the carriage against a fixed positive stop; since the longitudinal position of the work pieces relative to the work carriage would never be the same.

One method of compensating for this condition consists in resiliently suspending, in a base member on a work carriage, a feeler having one end for engaging an end face of a work piece also mounted on the carriage, and the other end for engaging an indicator mounted on the bed of the machine in fixed relation with the grinding wheel. The work engaging feeler contacts the face opposite the shoulder member as the carriage moves to the left to bring the shoulder portion of the work piece into engagement with the grinding wheel, while the opposite end of said feeler moves toward the indicator. Regardless of the depth of the center hole in the work, the work will be properly positioned when the indicator reads zero. Thus, the indicator shows the position of the work relative to the grinding wheel rather than the position of the carriage.

It is therefore an object of this invention to provide a device which can be kept in a convenient position close to its operative position.

A further object is to provide a device which will indicate with a high degree of accuracy the amount of stock removal where such an operation is necessary to locate a work piece.

A further object is to provide means for indicating the amount of endwise movement necessary to locate a work piece and then to indicate when said movement has been completed.

A further object is to provide a simplified and more accurate mechanism for transmitting the movement of the work surface to the indicating device.

In the drawings:

Figure 1 is a partial end elevation of a grinding machine showing the position of the locating device.

Figure 2 is a plan view.

Figure 3 is a front elevation, partly in section, showing the H slot for positioning the work engaging member.

Numeral 10 indicates the bed of a grinding machine, 11 a work carriage slidably mounted thereon and 12 a grinding wheel rotatably supported in the conventional manner on a wheel base (not shown). A headstock 13 and footstock 14, mounted on carriage 11 have centers 15 and 16 upon which is rotatably mounted a work piece 17. Said work piece has a shoulder portion 18 thereon which must be held to a predetermined position relative to the rest of the work piece.

Carriage 11 has a rack 25 attached to the underside thereof for engaging a gear 26 mounted on a shaft 27 which is rotatably mounted in bed 10. Handwheel 28 on the end of shaft 27 serves as a means for manually causing endwise movement of carriage 11.

The means for locating the carriage 11 and work piece 17 in proper relation to grinding wheel 12 consists of a base member 30 secured to the dove tail portion 19 of table 39 on carriage 11 by means of a clamping block 20 and screw 21.

Said base 30 has a hollow portion 31 having pivot screws 32 extending thru opposite sides thereof for pivotally supporting a pivot block 33 therein. Said block 33 has an elongated hole 34 thru which passes a work engaging member 35. Said member has a feeler 36 at one end thereof for engaging a shoulder or other annular surface on a work piece. The other end of said member has a portion 37 for engaging and actuating an indicator 38. Work engaging member 35 is supported from pivot block 33 by means of 2 sets of leaf springs 41 and 42, each set being made up of two springs. Springs 42 are shorter than and overlap springs 41. Springs 41 are secured to member 35 by two screws, one of which also passes through springs 41 to hold said springs to said member 35. The other ends of said springs are secured in vertically spaced relation on block 33. These sets of springs are attached in spaced relation on opposite sides of block 33 by suitable means such as cap screws and extend parallel to member 35 to which the other end of each spring is attached in overlapping relation, also by cap screws. Member 35 is substantially circular in cross section where it passes through block 33 but widens to a larger rectangular cross section at the point of attachment of springs 41 and 42. This type of mounting makes possible a substantially straight line movement of both ends of member 35. It has been found that maximum accuracy is achieved when said sets of springs are more widely spaced at the pivot block than where they are attached to member 35. The reason for this is that when parallel springs, one end of which is attached to a fixed member and the other to a movable member, are flexed the movable member moves in a slightly curved path. This is due to the fact that the two springs are under different stresses and do not flex equally. By increasing the spacing of the springs at the fixed end this tendency can be counteracted.

This difference is found accurately by the use of gauge blocks. Thereafter for all springs of the same length, the difference in spacing is the same. The difference in spacing is a predetermined amount and depends on the length of the springs. As shown in Figure 2, work engaging member 35 is biased, that is, positioned to one side of the center of hole 34 in block 33 as shown in Figure 2 in the direction of the surface which feeler 36 is to contact. This direction may be reversed to engage the opposite face of shoulder 18 by removing block 33 and reversing it relative to springs 41 and 42. Said work engaging member 35 is held in operative position relative to the work piece 17 by means of a spring 45 attached at one end to base member 30 at the other end to pivot block 33. A stop screw 46 in base member 30 engages a projecting portion 47 on block 33 and thus locates feeler 36 in operative relation with work 17. The position of feeler 36 may be reversed by removing the screws which fasten springs 41 and 42 to work engaging member 35 and turning said member 180° on its axis. After the locating operation has been completed, the operator may grasp knob 48 and shift member 35 to the dotted line position shown in Figure 1. Member 35 passes thru a horizontal H slot 50 in the front end of hollow portion 31 of said base member. When shifted to the inoperative position described above member 35 may be latched by moving it into either side of the upper horizontal part of the H slot. This shift to inoperative position does not change the axial location of the work engaging member.

Indicator 38 is mounted on a bracket 55 which is adjustably secured to a bar 56 on bed 10.

Operation

In grinding a piece such as that shown in Figure 2, feeler 36 is placed in contact with the face opposite that being ground by shifting member 35 into the lower portion of slot 50 and moving same to the right until feeler 36 is in position to engage the right hand face of shoulder 18. The other end of member 35 is engaged by the feeler of indicator 38. Said indicator may be set so that when the proper amount of stock has been removed by feeding the carriage to the left, the pointer will be at the zero position.

The grinding operation is effected by moving carriage 11 to the left by means of handwheel 28 and associated parts. Indicator 38 being mounted on the bed is stationary. As the grinding operation proceeds the locating device moves with the carriage. This movement is shown on indicator 38.

When the feeler 36 is placed in engagement with the end of the work piece, the opposite end 37 is immediately positioned relative to the indicator 38 to compensate for any variation in the axial position of the work piece relative to the carriage due to variation in depth of center holes. The indicator engaging portion, in effect, is an adjustable positive stop. Adjustment of said stop is effected in accordance with the axial position of the work. For example, if the left end center hole is deeper than usual, the work will be positioned more to the left when placed on the centers and thus will be closer to the grinding wheel.

When the feeler 36 is placed against the end face of the work opposite the surface to be ground, it automatically compensates the indicator engaging end by moving it toward the indicator the same amount as the work is to the left of the usual position. The accuracy of this movement is due to the fact that the supporting springs are more widely spaced at one end than at the other, which assures that both ends 36 and 37 move together. For example, the width of the pivot block 47 between springs is greater than the width of the work engaging member 35 at the point where the springs are attached. This condition may be reversed or the difference in spacing may be varied to suit conditions. If one end is held stationary, the other end will remain stationary.

As the carriage moves to the left to place the shoulder portion of the work in operative relation to the grinding wheel, it has a shorter distance to move than usual and the indicator engaging portion of the feeler has already moved to the left by the same amount as the work engaging feeler. When the indicator points to zero, the shoulder portion of the work piece should be in proper relation with the grinding wheel. If it is desired to remove a predetermined amount of metal, the indicator may be advanced by that amount and the movement of the carriage continued. When the zero point is reached, the shoulder will have been ground to the desired size.

This invention is not limited in its application to the arrangement shown in the drawings. The invention lies in the structure and mounting of the work engaging apparatus. In the drawings this structure is shown as mounted on the work table of a machine tool while the indicator is mounted on the bed. The purpose of this arrangement is to indicate the extent of axial movement of the work relative to the wheel and thus to locate the work for a plunge cut operation. This function of the device is to illustrate the operation thereof. Other functions may require that both indicator and work contactor be mounted on the carriage or both on the bed depending upon whether the work is to be located axially or size determined, or whether a high degree of sensitivity or a wide range of movement is desired. In every case the structure remains the same.

We claim:

1. In a grinding machine having a bed, a grinding wheel support and grinding wheel rotatably mounted thereon, a work carriage slidably mounted thereon, and means on said carriage for rotatably supporting a work piece, a work locating device including a base member on said carriage, a member pivotally mounted on said base member, a work engaging member resiliently suspended from said pivotally mounted member by means of flat springs spaced more widely on one of said members than on the other, said work engaging member being adapted to engage an end face of said work piece other than the surface to be ground, an indicator mounted on said bed and positioned in the path of movement of said work engaging member as the work piece is moved toward said grinding wheel.

2. In a grinding machine having a bed, a grinding wheel support and grinding wheel rotatably mounted thereon, a work carriage slidably mounted thereon, and means on said carriage for rotatably supporting a work piece, a work locating device including a base member on said carriage, a member pivotally mounted on said base member, a work engaging member resiliently suspended from said pivotally mounted member and rotatable therewith toward and away from operative relation with said work piece and having one end adapted to engage an end face of said work piece, an indicator mounted on said bed, the other end of said work engaging member being adapted to engage said indicator to indicate the position of said work piece relative to said grinding wheel.

3. In a grinding machine having a bed, a grinding wheel support and a grinding wheel rotatably mounted thereon, a work carriage slidably mounted thereon, and means on said carriage for rotatably supporting a work piece, a work locating device including a base member on said carriage, a member pivotally mounted on said base member, a work engaging member resiliently suspended from said pivotally mounted member and adapted to engage an end face of said work piece, an indicator mounted on said bed in fixed predetermined relation to said grinding wheel, whereby to indicate the axial position and movement of said work piece relative to said grinding wheel regardless of the axial position thereof when first placed in said machine.

4. Apparatus for indicating change in position of an annular surface of said work piece including an elongated work engaging member substantially perpendicular to the axis of said work piece having a feeler finger at one end thereof for engaging an end face of a work piece, the other end of said member being adapted to engage an indicator, a base member, a support member mounted thereon, spaced, flat, resilient members extending lengthwise of said work engaging member and on opposite sides thereof and each having one end attached to said support member and the other end to said work engaging member at a point intermediate the ends thereof, said resilient members being spaced more widely on one of said members than on the other, whereby a movement of one end of said work engaging member is duplicated at the other end thereof in direction as well as in magnitude.

5. Apparatus for indicating a change in the position of an annular surface of a work piece including an elongated work engaging member having a feeler finger at one end thereof for engaging an end face of said work piece opposite to that to be ground, the other end of said member being remote from the point of operation, and adapted to engage an indicator, a base member, a support member mounted thereon, spaced, flat, resilient members extending lengthwise and on opposite sides of said work engaging member and having one end attached to said support member and the other end to said work engaging member at a point intermediate the ends thereof, and means for compensating for difference in stresses in the resilient members by spacing said resilient members farther apart at one end than at the other so that movement of one end thereof causes identical movement of the other end.

HAROLD E. BALSIGER.
C. C. WALKER WILLIAMS.

REFERENCES CITED

The following references are of record in the file of this patent:

UNITED STATES PATENTS

| Number | Name | Date |
| --- | --- | --- |
| 191,586 | Hatch | June 5, 1877 |
| 1,225,858 | Raule | May 15, 1917 |
| 1,456,938 | Schoof | May 29, 1923 |
| 1,792,043 | Scusa | Feb. 10, 1931 |
| 1,832,511 | Settem | Nov. 17, 1931 |
| 2,065,951 | Terry | Dec. 29, 1936 |
| 2,177,399 | Aller | Oct. 24, 1939 |
| 2,237,496 | Muskovin | Apr. 8, 1941 |
| 2,240,536 | Woxen | May 6, 1941 |
| 2,302,090 | Aller | Nov. 17, 1942 |
| 2,331,779 | Hjarpe et al. | Oct. 12, 1943 |